US011592670B2

(12) United States Patent
Smith et al.

(10) Patent No.: US 11,592,670 B2
(45) Date of Patent: Feb. 28, 2023

(54) COMPACT HIGH FIELD OF VIEW DISPLAY

(71) Applicant: Sharp Kabushiki Kaisha, Osaka (JP)

(72) Inventors: William Frederick Smith, Oxford (GB); David James Montgomery, Oxford (GB); Chengze Song, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 16/529,938

(22) Filed: Aug. 2, 2019

(65) Prior Publication Data

US 2021/0033865 A1 Feb. 4, 2021

(51) Int. Cl.
*G02B 27/01* (2006.01)
*G02B 5/30* (2006.01)
(Continued)

(52) U.S. Cl.
CPC ........... *G02B 27/0172* (2013.01); *G02B 3/08* (2013.01); *G02B 5/3083* (2013.01); *G02B 27/286* (2013.01)

(58) Field of Classification Search
CPC ............... G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134;
(Continued)

(56) References Cited

U.S. PATENT DOCUMENTS 5,748,375 A * 5/1998 Yamana ............. G02B 27/0172
359/802
9,632,315 B2 4/2017 Smith et al.
(Continued)

FOREIGN PATENT DOCUMENTS

WO WO 2017108211 A1 6/2017
WO WO 2018052493 A1 3/2018

*Primary Examiner* — Thomas K Pham
*Assistant Examiner* — Henry A Duong
(74) *Attorney, Agent, or Firm* — Renner, Otto, Boisselle & Sklar, LLP

(57) ABSTRACT

A wide field of view display device employs curved optical components for enhanced performance with a compact arrangement. A wide field of view display includes a curved display device; a first curved lens having a display side and an exit side, wherein the display side is facing the curved display device; a first plurality of Fresnel facets disposed on the display side of the first curved lens; a second curved lens having a display side and an exit side, wherein the display side is facing the exit side of the first curved lens; and a second plurality of Fresnel facets disposed on the display side of the second curved lens, wherein the first plurality of Fresnel facets is configured to focus light from the curved display device on the second plurality of Fresnel facets, and wherein the second plurality of Fresnel facets is configured to focus light from the first plurality of Fresnel facets on a central image point.

26 Claims, 5 Drawing Sheets

(51) Int. Cl.
  *G02B 27/28* (2006.01)
  *G02B 3/08* (2006.01)
(58) Field of Classification Search
  CPC .... G02B 2027/0136; G02B 2027/0138; G02B
    2027/014; G02B 2027/0141; G02B
    2027/0143; G02B 2027/0145; G02B
    2027/0147; G02B 2027/015; G02B
    2027/0152; G02B 2027/0154; G02B
    2027/0156; G02B 2027/0158; G02B
    2027/0159; G02B 2027/0161; G02B
    2027/0163; G02B 2027/0165; G02B
    2027/0167; G02B 2027/0169; G02B
    2027/0174; G02B 2027/0178; G02B
    2027/0181; G02B 2027/0183; G02B
    2027/0185; G02B 2027/0187; G02B
    2027/019; G02B 2027/0192; G02B
    2027/0194; G02B 2027/0196; G02B
    2027/0198; G02B 5/3083; G02B 27/286;
    G02B 3/08

USPC ........................................................ 359/630
See application file for complete search history.

(56) References Cited

U.S. PATENT DOCUMENTS

| | | | |
|---|---|---|---|
| 11,067,724 B2 * | 7/2021 | Perreault | G02B 26/0875 |
| 11,073,701 B2 * | 7/2021 | Matsumura | G02B 27/0172 |
| 2016/0377869 A1 | 12/2016 | Lee et al. | |
| 2017/0212361 A1 | 7/2017 | Staton | |
| 2017/0336539 A1 | 11/2017 | Perreault et al. | |
| 2018/0098694 A1 * | 4/2018 | Schmeder | A61H 5/00 |
| 2018/0136460 A1 | 5/2018 | Bierhuizen et al. | |
| 2018/0348520 A1 * | 12/2018 | Chiu | H04N 13/344 |
| 2019/0101767 A1 * | 4/2019 | Geng | G02B 27/017 |
| 2021/0141211 A1 * | 5/2021 | Lou | G02B 9/04 |
| 2021/0157035 A1 * | 5/2021 | Takagi | G02B 27/02 |
| 2021/0231951 A1 * | 7/2021 | Dominguez | G02B 27/017 |

\* cited by examiner

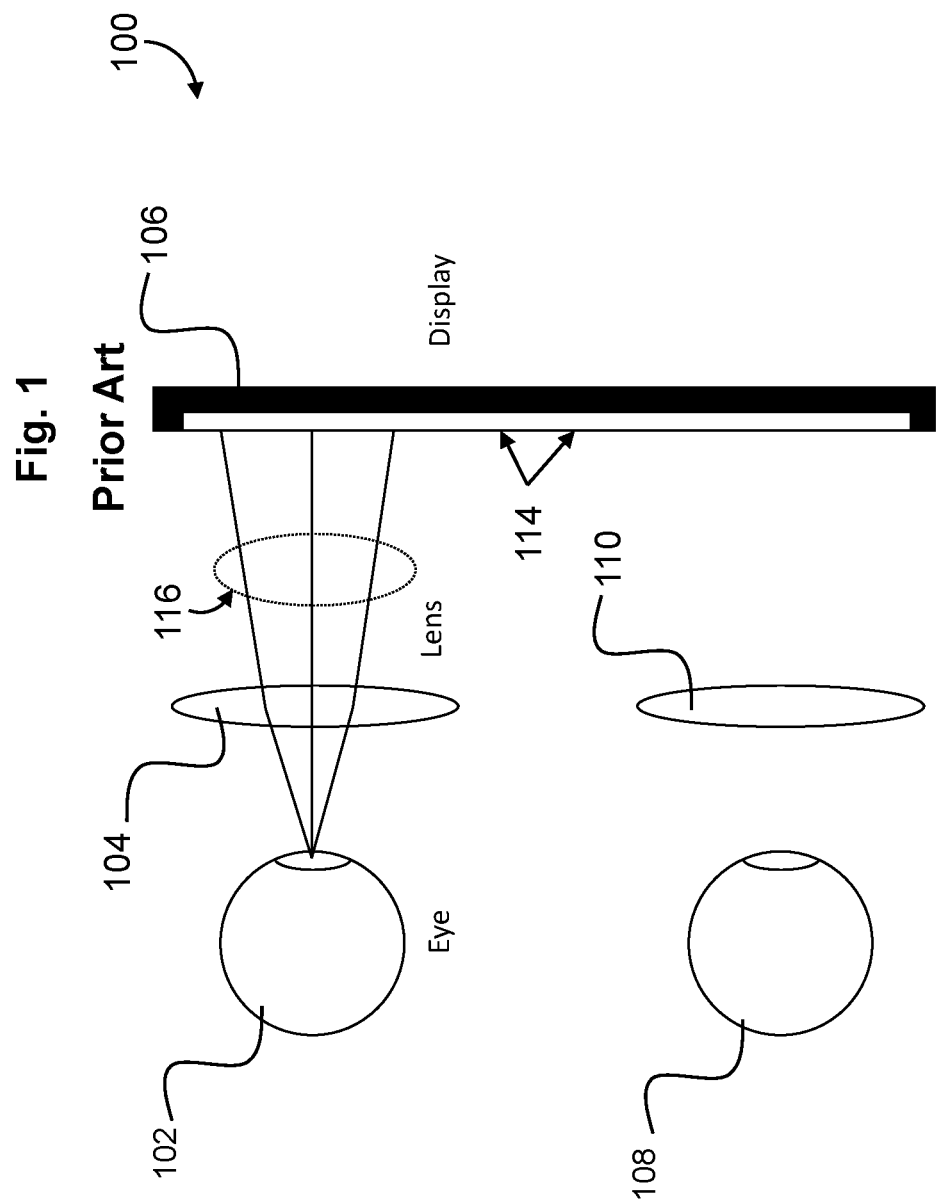

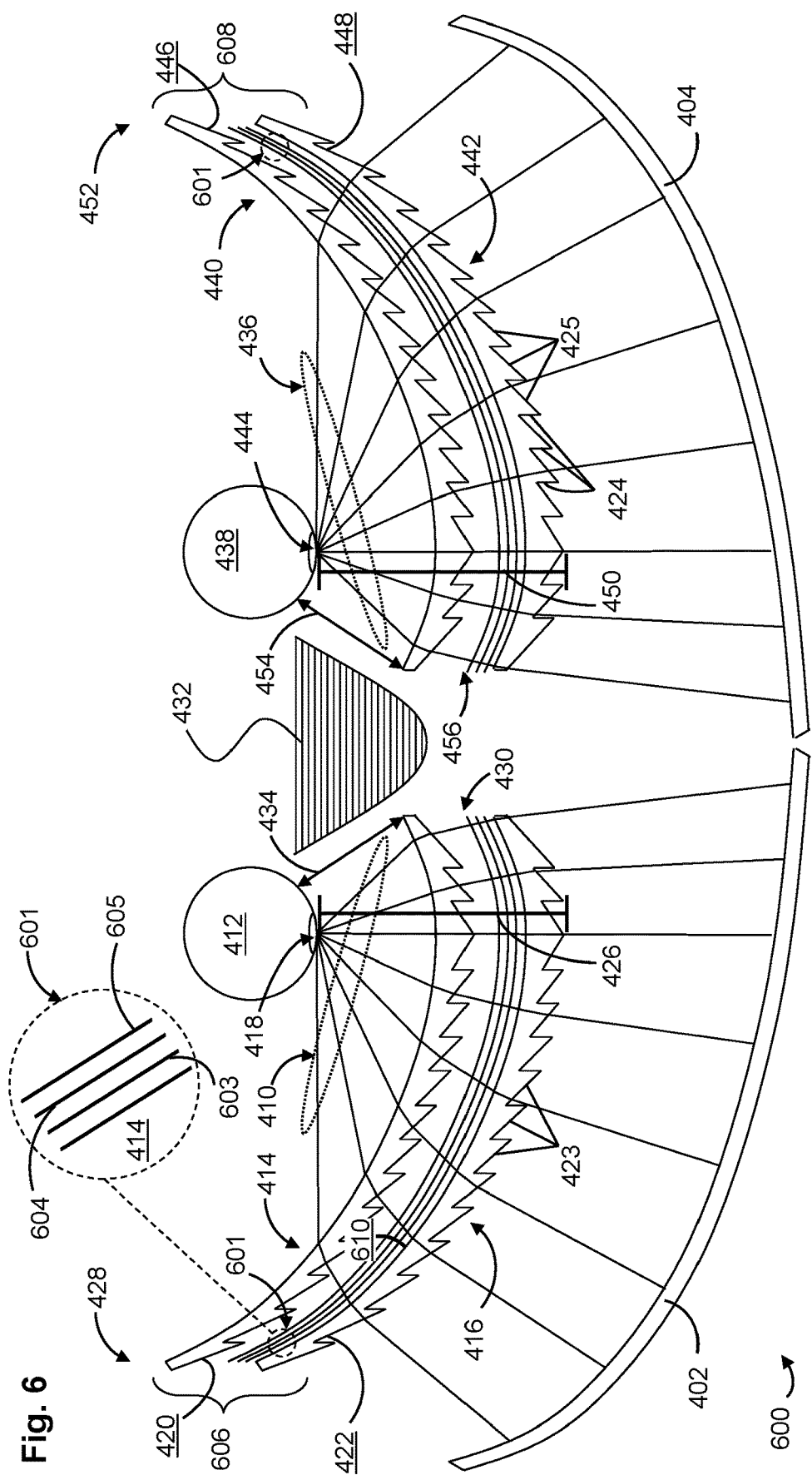

COMPACT HIGH FIELD OF VIEW DISPLAY

TECHNICAL FIELD

The present disclosure relates generally to display devices, and more specifically to wearable displays that create a panoramic field of view (FOV) in a head mounted display device.

BACKGROUND ART

A conventional head mounted display (HMD) can be used to display a virtual world to a user with a FOV around 110°. Attempts to increase the immersivity experienced by a user by providing a wider FOV have resulted in larger, heavier, and more expensive devices. The increase in size and expense of wider FOV HMDs arises partly because the optical components that direct the light paths, such as mirrors in particular, must be fabricated separately and positioned at precise locations in an HMD. The result is a panoramic HMD that is larger, more complex, and has numerous optical components compared to narrow FOV HMDs. Additionally, the additional optical components increase the extent of optical aberrations at the edge of the FOV. As a result, size, weight, and cost deter the adoption and regular usage of panoramic HMDs, leaving users limited to a virtual world in which they can see far less than their eyes can see.

Conventional approaches have been described for HMDs that provide a wider FOV using one screen and substantially curved Fresnel lenses. In one approach, WO 2018052493 A1 (Wheelwright, published Mar. 22, 2018) describes a system with two Fresnel surfaces of different strengths and a curved Fresnel lens that is partially split into two lens portions. US 20180136460 A1 (Bierhuizen, published May 17, 2018) describes an HMD that includes heavily curved Fresnel surfaces with parallel or varying draft facets. U.S. Pat. No. 9,632,315 B2 (Smith, issued Apr. 25, 2017) describes a heavily curved Fresnel surface in which the facets point to the eye center. US 20170336539 A1 (Perreault, published Feb. 26, 2019) describes a total internal reflection (TIR) Fresnel lens assembly as to which the pupil of a user sits forwards of the edge. US 20160377869 A1 (Lee, published Dec. 29, 2016) describes cylindrically curved Fresnel lenses and mirrors.

Conventional approaches have also been described for HMDs that provide a wider FOV using two screens and multiple flat Fresnel lenses that increase manufacturing and image processing complexity. For example, WO 2017108211 A1 (Anton, published Jun. 29, 2019) describes a head mounted display with canted Fresnel lenses and screens.

Conventional approaches have also been described for HMDs with an adjustable screen position to correct for the eyesight of a user. For instance, US 20170212361 A1 (Staton, published Jul. 7, 2019) describes an HMD with focal adjustment screws for screen movement. The additional components for mechanical adjustment can undesirably as to the size and weight of the HMD.

SUMMARY OF INVENTION

The present invention provides designs for a panoramic HMD with a panoramic FOV, and in particular a FOV above 180° in exemplary embodiments. The designs described include effective optical components but retain a comparatively small overall size and light weight. Unlike a conventional HMD, the present invention includes substantially curved lenses and screens. The curvature of one or more lenses and one or more screens is in at least one axis (i.e., cylindrical curvature), ore may be in two axes (i.e., spherical curvature). The curvatures are not limited to cylindrical or spherical sections and may follow the curvature or contours of the head of a user. In other words, the curvature appears concave relative to the user.

As well as curvature, the one or more lenses include a lens stack having a short focal length. The short focal length enables a device in which the curved screen is at a shorter distance from the user as compared to conventional HMDs. The focal length is low compared to the width of the lens providing a "fast" lens stack, i.e., a lens stack with a low F-number. To reduce optical aberrations, a separate lens is included for each eye of a user. Two or more Fresnel surfaces may be included in the lens stack to further minimize optical aberrations. The lens stack may include lens tinting and circular polarizers to reduce the scattered light introduced by the Fresnel surfaces.

To increase the FOV of a panoramic HMD while maintaining a simple and compact arrangement, embodiments described herein use a curved lens stack with multiple Fresnel surfaces for each eye of a user. Each curved lens stack can be positioned to direct rays from a curved display screen to a retina of a user. Embodiments described herein provide a modestly sized HMD with lightweight Fresnel lenses and a very wide FOV.

This approach has several advantages. The curvature of the lenses and display may be configured to wrap around the eye and increase the FOV. A single screen can be used for the entire system, or separate screens can be used for the for each eye of a user. For example, a first screen can provide a first image for the right eye of a user and a second screen can provide a second image for the left eye of the user. The lenses and screens can be designed in a manner that yields a FOV with an angular resolution that corresponds to the resolution of the eye of a user.

An aspect of the invention, therefore, is a wide field of view display device that employs curved optical components for enhanced performance with a compact arrangement. In exemplary embodiments, a wide field of view display includes a curved display device; a first curved lens having a display side and an exit side, wherein the display side is facing the curved display device; a first plurality of Fresnel facets disposed on the display side of the first curved lens; a second curved lens having a display side and an exit side, wherein the display side is facing the exit side of the first curved lens; and a second plurality of Fresnel facets disposed on the display side of the second curved lens, wherein the first plurality of Fresnel facets is configured to focus light from the curved display device on the second plurality of Fresnel facets, and wherein the second plurality of Fresnel facets is configured to focus light from the first plurality of Fresnel facets on a central image point.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 is a schematic drawing depicting a display arrangement in a conventional HMD.

FIG. 6 is a cross-sectional drawing depicting a curved lens stack with a filtering system disposed in the curved lens stack according to embodiments of the present application.

DESCRIPTION OF EMBODIMENTS

Figure 3:
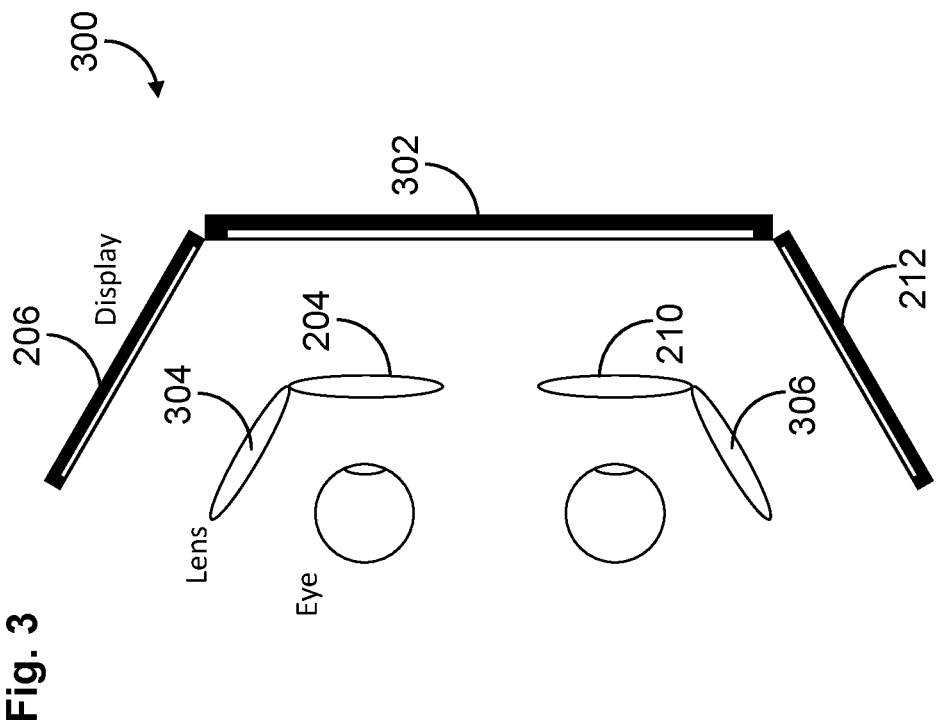
FIG. 3 is a schematic drawing depicting a second conventional technique to increase the field of view in an HMD.

Embodiments of the present invention will now be described with reference to the drawings, wherein like reference numerals are used to refer to like elements throughout. It will be understood that the figures are not necessarily to scale.

Conventional HMDs

To better understand the distinctions and advantages of the present invention, comparison is made to conventional HMD configurations. FIG. 1 is a schematic drawing depicting a display arrangement in a conventional HMD 100. The conventional HMD 100 can include a display 106, a first lens 104 associated with a first eye 102 of a user, and a second lens 110 associated with a second eye 108 of the user. The display 106 can show two images 114 side by side. The light 116 from the two images can be collimated by the first lens 104 and the second lens 110 to allow the eyes to focus at a comfortable distance. The conventional HMD 100 limits the field of view (FOV) associated with the eyes of a user to approximately 110°. Humans have approximately a 210° horizontal FOV, and the limited FOV in conventional HMDs decreases the immersivity and realism of the experience of a user. Systems and methods are needed to improve the FOV in HMDs.

Figure 2:
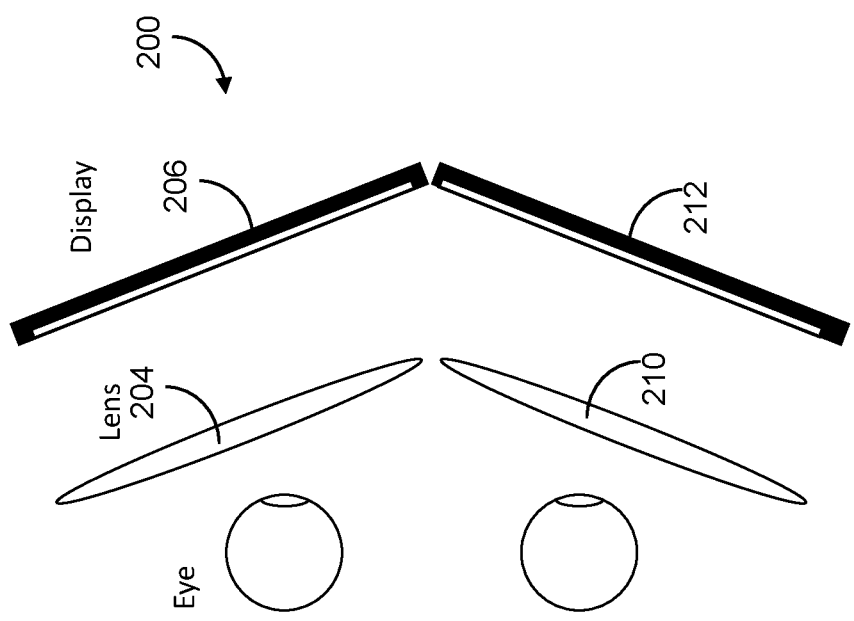
FIG. 2 is a schematic drawing depicting a first conventional technique to increase the field of view in an HMD.

FIG. 2 is a schematic drawing depicting a first conventional technique to increase the FOV in a conventional HMD 200. Conventional techniques to increase the FOV shown in FIG. 2 include increasing the size of the optical components and increasing the number of displays. HMD 200 includes a larger first lens 204 and a larger second lens 210 as compared to the lenses in the base configuration of FIG. 1. Although the FOV is improved, the larger lenses increase the size and weight of the HMD 200 and increase optical aberrations. To reduce aberrations, the focal length can be increased to accommodate the larger lens size and maintain a constant F-number. As a result, the increase in focal length will increase the size of the HMD and reduce the appeal of the device to a user.

In addition to increased lens size, the HMD 200 may include a first display 206 and a second display 212. Both the screens and lenses can be tilted to increase the total FOV. The number, size, and position of additional screens may vary, but the approach leads to increased size, complexity, and cost over a single screen design.

FIG. 3 is a schematic drawing depicting a second conventional technique to increase the FOV in another conventional HMD 300. The conventional HMD 300 uses a third screen 302, a third lens 304, and a fourth lens 306 to increase the FOV. Again, the increased number of optical components and screens and associated alignment requirements leads to increased size, complexity, and cost over the conventional HMD design of FIG. 1.

Wide Field of View HMD Using Stacked Fresnel Surfaces

Accordingly, there is a need in the art for improved systems and methods to increase the FOV in HMDs. The embodiments described herein use a curved lens stack with one or more Fresnel surfaces, and a curved screen to provide a modestly sized HMD with lightweight Fresnel lenses, and a very wide FOV is thus achieved. The screens and lenses are curved to follow the head of a user and therefore reduce size. The lenses have a short combined focal length to maintain a moderate size. The one or more Fresnel surfaces are used to form a lens stack with a short focal length and minimum optical aberrations. Lens tinting, circular polarizers and the like are used to reduce the scattered light introduced by the Fresnel surfaces. The curved lens stack can be positioned to direct a set of light rays from the curved screen to a retina of a user.

Figure 4:
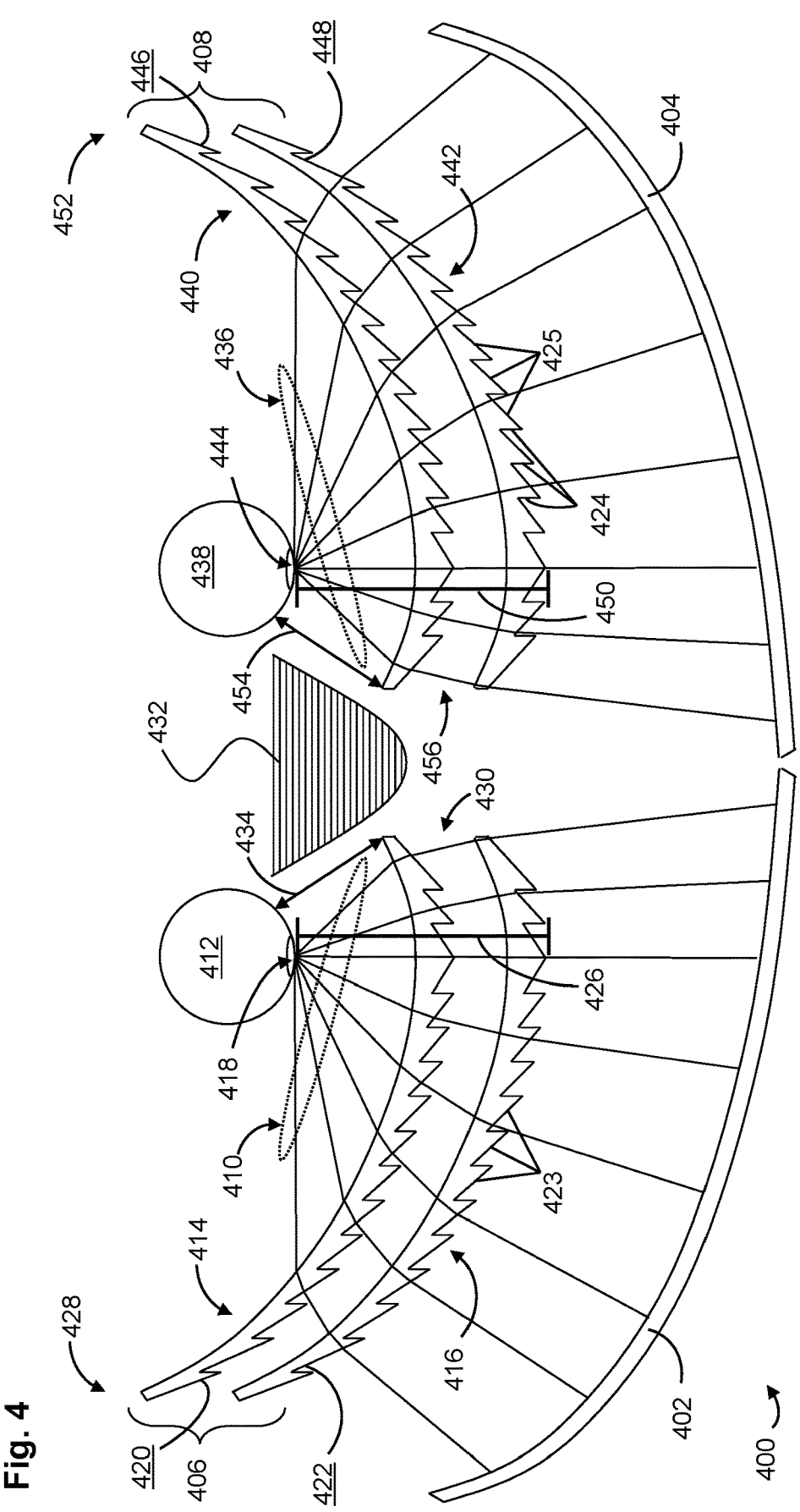
FIG. 4 is a cross-sectional drawing depicting a curved lens stack directing rays from a curved display screen according to embodiments of the present application.

The present invention relates to a panoramic display that can improve the FOV in HMDs. Turning to FIG. 4, a cross-sectional drawing depicting an optics block directing central rays from a display device according to embodiments of the present invention is shown. The HMD 400 includes a first display device 402, a second display device 404, a first lens stack 406, and a second lens stack 408. The lens stacks and the display devices have a curvature that generally follows the head of a typical user. The axis of curvature may be the same for both the lens stacks and the display devices. The lens stacks and display devices may have a radius of curvature between 100 mm and 200 mm depending on design requirements of a specific application. The curvature reduces the overall size of the HMD as compared to a conventional HMD that uses flat lenses and flat screens to achieve a similar FOV. Although shown having cylindrical curvature about a single axis in FIG. 4, the display devices and lens stacks may have curvature in one or more axes creating a spherical, spheroid, or ellipsoidal shape. One of ordinary skill in the art would recognize many variations, modifications, and alternatives.

The first display device 402 and the second display device 404 may include one or more screens. Each screen may include a plurality of pixels as are known in the art. In some embodiments, the pixels include components of a light-emitting display device such as for example an organic light-emitting diode (OLED), a micro LED, a quantum dot LED, a liquid crystal display, and the like.

The first lens stack 406 may be positioned in the HMD 400 to direct a first set of light rays 410 to a first eye 412 of a user. The first lens stack 406 includes one or more curved lenses. For example, the first lens stack 406 includes a first curved lens 414 and a second curved lens 416 configured to direct the set of rays 410 to a central image point 418 corresponding to the FOV of the first eye 412 of the user. To minimize aberrations, a first Fresnel surface 420 is formed on a display side of the first curved lens 414, and a second Fresnel surface 422 is formed on a display side the second curved lens 416.

The Fresnel surfaces include a plurality of prisms 423 configured to direct the set of light rays 410 to the first eye 412 of the user. Each prism of the plurality of prisms 423 includes a draft facet 424 and a slope facet 425. Conventional HMDs use a single lens, with an aspherical curvature on one side and with a Fresnel lens surface on the other. Extending the single lens design to wide fields of view results in very steep Fresnel facet angles in the conventional configurations, and such steep angles are hard to manufacture and cause higher aberrations and a loss in image formation due to total internal reflection off the facets. In contrast, embodiments of the present application using multiple Fresnel surfaces in the lens stack 406 allows the optical power to be shared between the Fresnel surfaces, which means the prisms 423 have shallower angles than conventional HMDs and thus overcome the deficiencies of conventional configurations.

In addition to minimizing aberrations, using the lens stack 406 with multiple Fresnel surfaces shortens a focal length 426 associated with the lens stack 406 and reduces total internal reflection from the prisms 423. The focal length 426 may be approximately 60 mm. The curvature of the first lens stack 406 may be configured such that the first eye 412 of the user is positioned in front of a lateral end 428 of the first lens stack 406. The curvature of the first lens stack 406 may be such that the first lens stack 406 is positioned at a distance 434 of approximately 15 mm from the first eye 412. A center end 430 opposite from the lateral end 428 of the first lens stack 406 is positioned close to a nose 432 of the user.

The second lens stack 408 may be positioned in the HMD 400 to direct a second set of light rays 436 to a second eye 438 of a user. The second lens stack 408 may be configured comparably as the first lens stack 406 but with the components configured to direct light to the second eye 438. The second lens stack 408 includes one or more curved lenses. For example, the second lens stack 408 includes a first curved lens 440 and a second curved lens 442 configured to direct the second set of rays 436 to a second central image point 444 corresponding to the FOV of the second eye 438 of the user. To minimize aberrations, a first Fresnel surface 446 is formed on a display side of the first curved lens 440, and a second Fresnel surface 448 is formed on a display side the second curved lens 442. The Fresnel surfaces include a plurality of prisms 423 configured to direct the second set of light rays 436 to the second eye 438 of the user.

In addition to minimizing aberrations, using the second lens stack 408 with multiple Fresnel surfaces shortens a focal length 450 associated with the second lens stack 408 and reduces total internal reflection from the prisms 423, comparably as discussed above in connection with the first lens stack 406. The focal length 450 may be approximately 60 mm. The curvature of the second lens stack 408 may be configured such that the second eye 438 of the user is positioned in front of a lateral end 452 of the second lens stack 408. The curvature of the second lens stack 408 may be such that the second lens stack 408 is positioned at a distance 454 of approximately 15 mm from the second eye 438. A center end 456 of the second lens stack 408 is positioned close to a nose 432 of the user.

The HMD may be configured to allow a user to adjust the position of the first lens stack 406 and the position of the second lens stack 408 to optimize the distance and the position of the optics of the HMD 400 for the eyes of the user.

Figure 5:
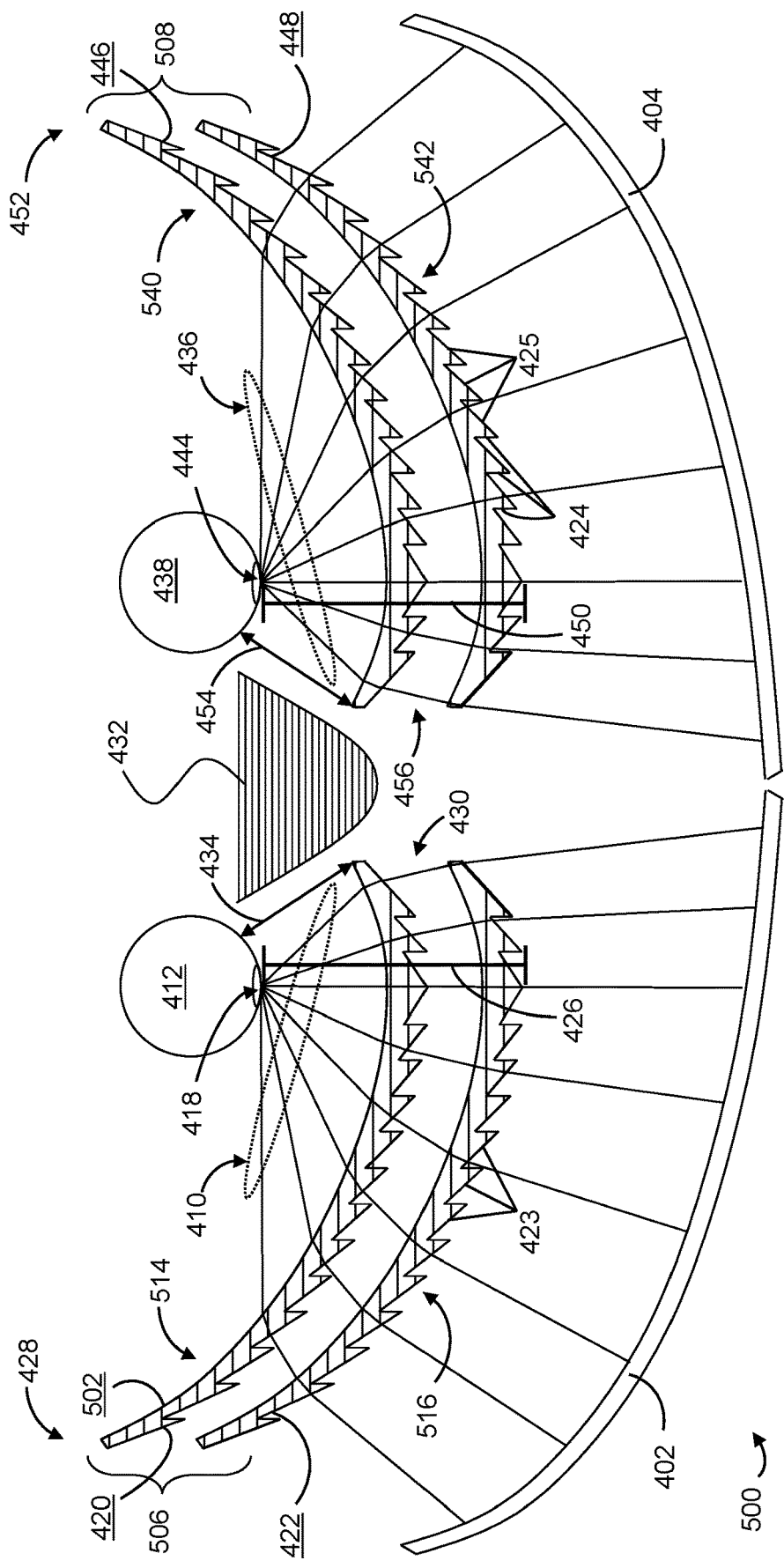
FIG. 5 is a cross-sectional drawing depicting a curved lens stack with a tinted lens directing rays from a curved display screen according to embodiments of the present application.

FIG. 5 is a cross-sectional drawing depicting a curved lens stack with a tinted lens directing rays from a curved display screen according to embodiments of the present invention. HMD 500 includes the first display device 402, the second display device 404, a first tinted lens stack 506 and a second tinted lens stack 508. The tinted lens stacks and the display devices have a curvature that follows the head of a user. The axis of curvature may be the same for both the lens stacks and the display devices. The lens stacks and display devices may have a radius of curvature between 100 mm and 200 mm depending on design requirements of a specific application. Similarly as with the previous embodiment, the curvature reduces the overall size of the HMD as compared to a conventional HMD that uses flat lenses and flat screens to achieve a similar FOV. Although shown having cylindrical curvature about a single axis in FIG. 5, the display devices and lens stacks may have curvature in one or more axes creating a spherical, spheroid, or ellipsoidal shape. One of ordinary skill in the art would recognize many variations, modifications, and alternatives.

The first tinted lens stack 506 may be positioned in the HMD 500 to direct the first set of light rays 410 to the first eye 412 of the user. The first tinted lens stack 506 includes one or more curved lenses formed with a tinted lens material in the body of the lens. For example, the first lens stack 506 includes a first tinted lens 514 and a second tinted lens 516 configured to direct the set of rays 410 to the central image point 418 corresponding to the FOV of the first eye 412 of the user. To minimize aberrations, the first Fresnel surface 420 is formed on the display side of the first tinted lens 514 and the second Fresnel surface 422 is formed on the display side the second tinted lens 516.

The Fresnel surfaces include the plurality of prisms 423 configured to direct the set of light rays 410 to the first eye 412 of the user. Each facet of the plurality of prisms 423 includes the draft facet 424 and the slope facet 425. As referenced above, conventional HMDs use a single lens, with an aspherical curvature on one side and with a Fresnel lens surface on the other. Extending the single lens design to wide fields of view results in very steep Fresnel facet angles in the conventional configurations, and steep angles are hard to manufacture and cause higher aberrations and a loss in image formation due to total internal reflection off the facets. As provided in embodiments of the current application, using multiple Fresnel surfaces in the first tinted lens stack 506 allows the optical power to be shared, which means the prisms 423 have shallower angles than conventional HMDs. Using multiple Fresnel surfaces results in an increase in the amount of scattered light caused by reflections within and between the lenses in the tinted lens stack 506.

The first tinted lens 514 and the second tinted lens 516 are configured to reduce blurring caused by internal reflection off the prisms 423. The tinted lenses may be formed using an acrylic lens with an absorbing material such as a dye mixed with the acrylic. The acrylic lens base may be acrylic (poly(methyl methacrylate)), polycarbonate or CR39, or other comparable material. Any suitable absorbing dye used in lens tinting may be employed, and the dye should be selected as one that has absorbing properties for all colors essentially equally. The tinted lenses may be configured to have an optical transmission efficiency of 50% for light propagating on the correct path. The tinted lenses cause reflected light travelling on an incorrect path to be attenuated further and thus reduce blurring caused by internal reflection. Tinting the lenses is effective because a main source of scattered light from Fresnel lenses is light entering the lens and then being reflected off an exit surface 502. This light can then take a variety of paths but all of such paths involve a much longer light path within the lens compared to light that passes straight through the lens without reflection. The increase in light path means that tinting the lens is an effective way to reduce the unwanted scattered light.

In addition to minimizing aberrations and blurring, using the tinted lens stack 506 with multiple Fresnel surfaces shortens the focal length 426 associated with the tinted lens stack 506 and reduces total internal reflection from the facets 423. The focal length 426 may be approximately 60 mm. The curvature of the first tinted lens stack 506 may be configured such that the first eye 412 of the user is positioned in front of the lateral end 428 of the first tinted lens stack 506. The curvature of the first tinted lens stack 506 may be such that the first tinted lens stack 506 is positioned at a distance 434 of approximately 15 mm from the first eye 412. The center end 430 of the first tinted lens stack 506 is positioned close to the nose 432 of the user.

The second tinted lens stack 508 may be positioned in the HMD 500 to direct the second set of light rays 436 to the second eye 438 of a user. The second tinted lens stack 508 may be configured comparably as the first tinted lens stack 506 but with the components configured to direct light to the second eye 438. The second tinted lens stack 506 includes one or more curved lenses formed with a tinted material in the body of the lens. For example, the second tinted lens stack 508 includes a first tinted lens 540 and a second tinted lens 542 configured to direct the second set of rays 436 to a second central image point 444 corresponding to the FOV of the second eye 438 of the user. To minimize aberrations, the first Fresnel surface 446 is formed on the display side of the first tinted lens 540 and a second Fresnel surface 448 is formed on a display side the second tinted lens 542. The Fresnel surfaces include the plurality of prisms 423 configured to direct the second set of light rays 436 to the second eye 438 of the user. Furthermore, the first tinted lens 540 and the second tinted lens 542 of the second tinted lens stack 508 may be configured as discussed above to reduce blurring caused by scattered light in the second tinted lens stack 508.

In addition to minimizing aberrations and blurring, using the second tinted lens stack 508 with multiple Fresnel surfaces shortens a focal length 450 associated with the second tinted lens stack 508 and reduces total internal reflection from the prisms 423, as discussed above in connection with the first tinted lens stack 506. The focal length 450 may be approximately 60 mm. The curvature of the second tinted lens stack 508 may be configured such that the second eye 438 of the user is positioned in front of the lateral end 452 of the second tinted lens stack 508. The curvature of the second tinted lens stack 508 may be such that the second tinted lens stack 508 is positioned at a distance 454 of approximately 15 mm from the second eye 438. The center end 456 of the second lens stack 408 is positioned close to a nose 432 of the user.

FIG. 6 is a cross-sectional drawing depicting a curved lens stack with a filtering system disposed in the curved lens stack lens according to embodiments of the present invention. HMD 600 includes the first display device 402, the second display device 404, a first lens stack 606 and a second lens stack 608. The lens stacks include a filtering system 601. As shown in the portion of FIG. 6 showing a close-up view of the filtering system 601, the filtering system 601 includes at least one or more of a linear polarizer 603, a quarter waveplate 604, and an antireflection film 605. The linear polarizer 603 is coupled to the exit surface 610 of the lens nearest the screen. The lens stacks, the filtering system 601, and the display devices have a curvature that follows the head of a user. The axis of curvature may be the same for the lens stacks, the filtering system 601 and the display devices. The lens stacks, filtering system, and display devices may have a radius of curvature between 100 mm and 200 mm depending on design requirements of a specific application. Although shown having cylindrical curvature about a single axis in FIG. 6, the display devices, lens stacks, and filtering system 601 may have curvature in one or more axes creating a spherical, spheroid, or ellipsoidal shape. One of ordinary skill in the art would recognize many variations, modifications, and alternatives.

The first lens stack 606 may be positioned in the HMD 600 to direct the first set of light rays 410 to the first eye 412 of the user. The first lens stack 606 includes one or more curved lenses. For example, the first lens stack 606 includes the first curved lens 414, the second curved lens 416, and the filtering system 601 disposed between the first curved lens 414 and the second curved lens 416. The first curved lens 414 and the second curved lens 416 are configured to direct the set of rays 410 to a central image point 418 corresponding to the FOV of the first eye 412 of the user. To minimize aberrations, the first Fresnel surface 420 is formed on the display side of the first curved lens 414 and the second Fresnel surface 422 is formed on the display side the second curved lens 416.

In an unfiltered lens stack, the first set of light rays 410 may pass through the second curved lens 416 closest to the display 402 and be reflected by the prisms 423 of the first lens 414 toward the second lens 416, and then reflected a second time back toward the first lens 414 and the eye 412 of the user. Without the filtering of this embodiment by the filtering system 601, the reflected light can reduce the contrast and provide a smearing effect on high brightness edges.

With filtering system 601, the first set of light rays passes through the filtering system 601 and undergoes polarization changes depending on the layers selected for the filtering system to reduce reflections in the lens stack 606. In FIG. 6, the first set of light rays 410 is linearly polarized by the linear polarizer 603 with a transmission axis in a first direction. The linearly polarized light is converted to circularly polarized light by the quarter waveplate 604 and passes through the antireflection film 605. The circularly polarized light is incident on the Fresnel surface 420 of the first lens 414, and a portion of the circularly polarized light is reflected toward the filtering system 601 and second curved lens 416. The reflected light is attenuated by the antireflective film 605 and converted to linearly polarized light with a transmission axis in a second direction by the quarter waveplate 604. The polarization is now orthogonal to the transmission axis of the linear polarizer 603, and thus this reflected light is absorbed.

The second lens stack 608 may be positioned in the HMD 600 to direct a second set of light rays 436 to a second eye 438 of a user. The second lens stack 608 may be configured comparably as the first lens stack 606 but with the components configured to direct light to the second eye 438. The second lens stack 608 includes one or more curved lenses and a filtering system located between the curved lenses. For example, the second lens stack 608 includes a first curved lens 440 and a second curved lens 442 configured to direct the second set of rays 436 to a second central image point 444 corresponding to the FOV of the second eye 438 of the user. The second lens stack 608 further includes a filtering system 601 disposed between the first curved lens 440 and the second curved lens 442, which functions comparably as described above with respect to the first lens stack 606. To minimize aberrations, a first Fresnel surface 446 is formed on a display side of the first curved lens 440, and a second Fresnel surface 448 is formed on a display side the second curved lens 442. The Fresnel surfaces include a plurality of prisms 423 configured to direct the second set of light rays 436 to the second eye 438 of the user.

In addition to the layers described in FIG. 6, the filtering system 601 may include lens tinting described in FIG. 5, draft 424 facet blackening, antireflection coatings on non-Fresnel surfaces, and placing two or more circular polarizer between the lenses. The filtering is specifically used to reduce scattered light from the multiple Fresnel lens surfaces and allow the HMD to create a contrast comparable with single Fresnel lens systems.

An aspect of the invention, therefore, is a wide field of view display device employs curved optical components for enhanced performance with a compact arrangement. In exemplary embodiments, a wide field of view display includes a curved display device; a first curved lens having a display side and an exit side, wherein the display side is facing the curved display device; a first plurality of Fresnel facets disposed on the display side of the first curved lens; a second curved lens having a display side and an exit side, wherein the display side is facing the exit side of the first curved lens; and a second plurality of Fresnel facets disposed on the display side of the second curved lens. The first plurality of Fresnel facets is configured to focus light from the curved display device on the second plurality of Fresnel facets, and wherein the second plurality of Fresnel facets is configured to focus light from the first plurality of Fresnel facets on a central image point. The display may include one or more of the following features, either individually or in combination.

In an exemplary embodiment of the wide field of view display, the first curved lens and the second curved lens each have a lateral end opposite from a center end, wherein each of the lateral ends form a field of view greater than 180°.

In an exemplary embodiment of the wide field of view display, at least one of the first curved lens and the second curved lens includes a tinted material.

In an exemplary embodiment of the wide field of view display, the tinted material is configured to have 50% optical transmission.

In an exemplary embodiment of the wide field of view display, the display further includes a filtering system disposed between the first curved lens and the second curved lens.

In an exemplary embodiment of the wide field of view display, the filtering system further comprises at least one element configured to absorb scattered light.

In an exemplary embodiment of the wide field of view display, the at least one element further comprises a linear polarizer coupled to the exit side of the first curved lens and configured to convert light to linearly polarized light having a first transmission axis; and a quarter waveplate configured to circularly polarize the linearly polarized light; wherein the quarter waveplate is further configured to convert circularly polarized light reflected from the display side of the second curved lens to a second linearly polarized state having a second transmission axis that is orthogonal to the first transmission axis.

In an exemplary embodiment of the wide field of view display, the display further includes an antireflective coating disposed between the first curved lens and the second curved lens.

In an exemplary embodiment of the wide field of view display, each facet of the first plurality of facets and the second plurality comprises a slope side and a draft side, wherein the draft side of one or more facets is blackened.

In an exemplary embodiment of the wide field of view display, the curved display device has a first radius of curvature from an axis; the first curved lens has a second radius of curvature from the axis; and the second curved lens has a third radius of curvature from the axis.

In an exemplary embodiment of the wide field of view display, the first radius of curvature, the second radius of curvature and the third radius of curvature are approximately equal.

In an exemplary embodiment of the wide field of view display, the curved display device, the first curved lens, and the second curved lens are characterized by one or more of the following shapes: cylindrical, spheroidal, ellipsoidal.

In an exemplary embodiment of the wide field of view display, a first lens stack includes the curved display device, the first curved lens, the first plurality of Fresnel facets, the second curved lens, and the second plurality of Fresnel facets. The wide field of view display further includes a second curved display device; a second lens stack comprising: a third curved lens having a display side and an exit side, wherein the display side is facing the second curved display device; a third plurality of Fresnel facets disposed on the display side of the third curved lens; a fourth curved lens having a display side and an exit side, wherein the display side is facing the exit side of the third curved lens; and a fourth plurality of Fresnel facets disposed on the display side of the fourth curved lens. The third plurality of Fresnel facets is configured to focus light from the second curved display device on the fourth plurality of Fresnel facets, and the fourth plurality of Fresnel facets is configured to focus light from the third plurality of Fresnel facets on a second central image point.

In an exemplary embodiment of the wide field of view display, the display includes a first curved display device; a first lens stack having a first Fresnel surface and a second Fresnel surface disposed between an exit surface of the first lens stack and the first curved display device, wherein an optical power of the first lens stack is shared between the first Fresnel surface and the second Fresnel surface; a second curved display device; and a second lens stack having a third Fresnel surface and a fourth Fresnel surface disposed between an exit surface of the second lens stack and the second curved display device, wherein an optical power of the second lens stack is shared between the third Fresnel surface and the fourth Fresnel surface.

In an exemplary embodiment of the wide field of view display, the first lens stack and the second lens stack each have a lateral end opposite from a center end, wherein each of the lateral ends form a field of view greater than 180°.

In an exemplary embodiment of the wide field of view display, at least one of the first lens stack and the second lens stack includes a tinted material.

In an exemplary embodiment of the wide field of view display, the display further includes a filtering system disposed between the first Fresnel surface and the second Fresnel surface of the first lens stack and between the third Fresnel surface and the fourth Fresnel surface of the second lens stack.

In an exemplary embodiment of the wide field of view display, the filtering system further comprises at least one element configured to absorb scattered light.

In an exemplary embodiment of the wide field of view display, the at least one element further comprises a linear polarizer configured to convert light to linearly polarized light having a first transmission axis; and a quarter waveplate configured to circularly polarize the linearly polarized light. The quarter waveplate is further configured to convert circularly polarized light reflected back toward the first curved display device and the second curved display device to a second linearly polarized state having a second transmission axis that is orthogonal to the first transmission axis.

In an exemplary embodiment of the wide field of view display, the display further includes an antireflective coating disposed between the first Fresnel surface and the second Fresnel surface of the first lens stack and between the third Fresnel surface and the fourth Fresnel surface of the second lens stack.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which an enhanced FOV may be desirable, including portable electronic display devices, and including in particular head mounted display devices that may be used in virtual reality (VR) and/or augmented reality (AR) applications.

REFERENCE SIGNS LIST

100—conventional HMD
102—first eye
104—first lens
106—display
108—second eye
110—second lens
114—two images
116—light
200—conventional HMD
204—first lens
206—first display
210—second lens
212—second display
300—conventional HMD
302—third screen
304—third lens
306—fourth lens
400—exemplary HMD
402—first display device
404—second display device
406—first lens stack
408—second lens stack
410—first set of light rays
412—first eye
414—first curved lens
416—second curved lens
418—central image point
420—first Fresnel surface
422—second Fresnel surface
423—prisms
424—draft facet
425—slope facet
426—focal length
428—lateral end
430—center end
432—nose
434—distance of lens stack to eye
436—second set of light rays
438—second eye
440—first curved lens
442—second curved lens
444—second central image point
446—first Fresnel surface
448—second Fresnel surface
450—focal length
452—lateral end
454—distance
456—center end
500—HMD
502—exit surface
506—first tinted lens stack
508—second tinted lens stack
514—first tinted lens
516—second tinted lens
540—first tinted lens
542—second tinted lens
600—HMD
601—filtering system
603—linear polarizer
604—quarter waveplate
605—antireflection film
606—first lens stack
608—second lens stack
610—exit surface

What is claimed is:

1. A wide field of view display comprising:
a curved display device;
a first curved lens having a display side and an exit side, wherein the display side is facing the curved display device;
a first plurality of Fresnel facets disposed on the display side of the first curved lens;
a second curved lens having a display side and an exit side, wherein the display side is facing the exit side of the first curved lens;
a second plurality of Fresnel facets disposed on the display side of the second curved lens, wherein the first plurality of Fresnel facets is configured to focus light from the curved display device on the second plurality of Fresnel facets, and wherein the second plurality of Fresnel facets is configured to focus light from the first plurality of Fresnel facets on a central image point; and
a curved filtering system disposed between the first curved lens and the second curved lens and coupled to the exit side of the first curved lens;
wherein the filtering is system is positioned to receive scattered light that is reflected from the second curved lens, and the filtering system has an absorbing element that absorbs the scattered light that is reflected from the second curved lens;
wherein the curved display device, the first curved lens, the second curved lens, and the curved filtering system have a same axis of curvature;

the curved display device, the exit side of the first curved lens, and the exit side of the second curved lens have a same axis of curvature; and each of the first curved lens and the second curved lens is a single non-composite lens.

2. The wide field of view display of claim 1, wherein the first curved lens and the second curved lens each have a lateral end opposite from a center end, wherein each of the lateral ends form a field of view greater than 180°.

3. The wide field of view display of claim 1, wherein at least one of the first curved lens and the second curved lens includes a tinted material.

4. The wide field of view display of claim 3, wherein the tinted material is configured to have 50% optical transmission.

5. The wide field of view display of claim 1, wherein the absorbing element comprises,
a linear polarizer coupled to the exit side of the first curved lens and configured to convert light to linearly polarized light having a first transmission axis; and
a quarter waveplate configured to circularly polarize the linearly polarized light;
wherein the quarter waveplate is further configured to convert circularly polarized light reflected from the display side of the second curved lens to a second linearly polarized state having a second transmission axis that is orthogonal to the first transmission axis.

6. The wide field of view display of claim 1, further comprising an antireflective coating disposed between the first curved lens and the second curved lens.

7. The wide field of view display of claim 1, wherein each facet of the first plurality of facets and the second plurality of facets comprises a slope side and a draft side, wherein the draft side of one or more facets is blackened.

8. The wide field of view display of claim 1, wherein the curved display device, the first curved lens, the second curved lens, and the curved filtering system are characterized by one of the following shapes: cylindrical, spheroidal, ellipsoidal.

9. The wide field of view display of claim 1, wherein a first lens stack includes the curved display device, the first curved lens, the first plurality of Fresnel facets, the second curved lens, and the second plurality of Fresnel facets, and wherein the wide field of view display further comprises:
a second curved display device;
a second lens stack comprising:
a third curved lens having a display side and an exit side, wherein the display side is facing the second curved display device;
a third plurality of Fresnel facets disposed on the display side of the third curved lens;
a fourth curved lens having a display side and an exit side, wherein the display side is facing the exit side of the third curved lens; and
a fourth plurality of Fresnel facets disposed on the display side of the fourth curved lens, wherein the third plurality of Fresnel facets is configured to focus light from the second curved display device on the fourth plurality of Fresnel facets, and wherein the fourth plurality of Fresnel facets is configured to focus light from the third plurality of Fresnel facets on a second central image point;
wherein the second curved display device, the exit side of the third curved lens, and the exit side of the fourth curved lens have a same axis of curvature; and
each of the third curved lens and the fourth curved lens is a single non-composite lens.

10. The wide field of view display of claim 1, wherein the curved filtering system spans continuously across multiple ones of the first plurality of Fresnel facets and the second plurality of Fresnel facets.

11. The wide field of view display of claim 1, wherein the curved display device, the first curved lens, the second curved lens, and the curved filtering system have a same radius of curvature between 100 mm and 200 mm.

12. The wide field of view display of claim 1, wherein the first curved lens and the second curved lens are separated from each other by a distance greater than a thickness of each of the first curved lens and the second curved lens.

13. The wide field of view display of claim 1, wherein the first plurality of Fresnel facets includes respective draft facets that are disposed at equal pitches, and the second plurality of Fresnel facets includes respective draft facets that are disposed at equal pitches.

14. The wide field of view display of claim 1, wherein a pitch of respective draft facets of the first plurality of Fresnel facets is equal to a pitch of respective draft facets of the second plurality of Fresnel facets.

15. The wide field of view display of claim 1, wherein each of the first plurality of Fresnel facets includes a first slope facet that transmits light from the first curved display device,
each of the second plurality of Fresnel facets includes a second slope facet that transmits light from the first slope facet, and
the first slope facet is parallel to the second slope facet.

16. A wide field of view display comprising:
a first curved display device;
a first lens stack having a first Fresnel surface and a second Fresnel surface disposed between an exit surface of the first lens stack and the first curved display device, wherein an optical power of the first lens stack is shared between the first Fresnel surface and the second Fresnel surface;
a second curved display device;
a second lens stack having a third Fresnel surface and a fourth Fresnel surface disposed between an exit surface of the second lens stack and the second curved display device, wherein an optical power of the second lens stack is shared between the third Fresnel surface and the fourth Fresnel surface; and
a curved filtering system disposed between the first Fresnel surface and the second Fresnel surface of the first lens stack, and between the third Fresnel surface and the fourth Fresnel surface of the second lens stack;
wherein the filtering is system is positioned to receive scattered light that is reflected from the second and fourth Fresnel surfaces, and the filtering system has an absorbing element that absorbs the scattered light that is reflected from the second and fourth Fresnel surfaces;
wherein the curved display device, the first curved lens, the second curved lens, and the curved filtering system have a same axis of curvature;
wherein the first curved display device and the exit surface of the first lens stack have a same axis of curvature;
wherein the second curved display device and the exit surface of the second lens stack have a same axis of curvature; and
each of lenses of the first curved lens stack and the second curved lens stack is a single non-composite lens.

17. The wide field of view display of claim 16, wherein the first lens stack and the second lens stack each have a lateral end opposite from a center end, wherein each of the lateral ends form a field of view greater than 180°.

18. The wide field of view display of claim 16, wherein at least one of the first lens stack and the second lens stack includes a tinted material.

19. The wide field of view display of claim 16, wherein the absorbing element comprises,
a linear polarizer configured to convert light to linearly polarized light having a first transmission axis; and
a quarter waveplate configured to circularly polarize the linearly polarized light;
wherein the quarter waveplate is further configured to convert circularly polarized light reflected back toward the first curved display device and the second curved display device to a second linearly polarized state having a second transmission axis that is orthogonal to the first transmission axis.

20. The wide field of view display of claim 16, further comprising an antireflective coating disposed between the first Fresnel surface and the second Fresnel surface of the first lens stack and between the third Fresnel surface and the fourth Fresnel surface of the second lens stack.

21. The wide field of view display of claim 16, wherein the curved filtering system spans continuously across multiple ones of the first plurality of Fresnel facets and the second plurality of Fresnel facets.

22. The wide field of view display of claim 16, wherein the curved display device, the first curved lens, the second curved lens, and the curved filtering system have a same radius of curvature between 100 mm and 200 mm.

23. The wide field of view display of claim 16, wherein lenses of the first lens stack and the second lens stack are separated from each other by a distance greater than a thickness of each of the first lens stack and the second lens stack.

24. The wide field of view display of claim 16, wherein the lenses of each of the first lens stack and the second lens stack include a first plurality of Fresnel facets that includes respective draft facets that are disposed at equal pitches, and a second plurality of Fresnel facets that includes respective draft facets that are disposed at equal pitches.

25. The wide field of view display of claim 24, wherein a pitch of respective draft facets of the first plurality of Fresnel facets is equal to a pitch of respective draft facets of the second plurality of Fresnel facets.

26. The wide field of view display of claim 24, wherein each of the first plurality of Fresnel facets includes a first slope facet that transmits light from the first curved display device,
each of the second plurality of Fresnel facets includes a second slope facet that transmits light from the first slope facet, and
the first slope facet is parallel to the second slope facet.

* * * * *